(12) United States Patent
Graindourze

(10) Patent No.: US 10,929,625 B2
(45) Date of Patent: Feb. 23, 2021

(54) AUTHENTICATION METHOD FOR PRODUCT PACKAGING

(71) Applicant: AGFA NV, Mortsel (BE)

(72) Inventor: Marc Graindourze, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 16/304,324

(22) PCT Filed: May 30, 2017

(86) PCT No.: PCT/EP2017/062962
§ 371 (c)(1),
(2) Date: Nov. 26, 2018

(87) PCT Pub. No.: WO2017/207524
PCT Pub. Date: Dec. 7, 2017

(65) Prior Publication Data
US 2019/0138775 A1   May 9, 2019

(30) Foreign Application Priority Data
May 31, 2016 (EP) ..................... 16172344

(51) Int. Cl.
| | |
|---|---|
| *G06K 7/10* | (2006.01) |
| *G06Q 30/00* | (2012.01) |
| *G06Q 10/08* | (2012.01) |
| *G06F 21/64* | (2013.01) |

(52) U.S. Cl.
CPC ......... *G06K 7/10861* (2013.01); *G06F 21/64* (2013.01); *G06K 7/10237* (2013.01); *G06K 7/10386* (2013.01); *G06Q 10/08* (2013.01); *G06Q 30/018* (2013.01)

(58) Field of Classification Search
CPC ... G06K 7/10722; G06K 7/14; G06K 7/10851
USPC ......................................................... 235/454
See application file for complete search history.

(56) References Cited

U.S. PATENT DOCUMENTS

| | | | |
|---|---|---|---|
| 2006/0232413 A1* | 10/2006 | Lam ................. | G06K 19/06018 340/572.1 |
| 2008/0128492 A1 | 6/2008 | Roth et al. | |
| 2011/0062237 A1* | 3/2011 | Chaves ............ | G06K 19/06018 235/454 |

(Continued)

FOREIGN PATENT DOCUMENTS

| | | |
|---|---|---|
| CN | 202351910 U | 7/2012 |
| CN | 103745256 A | 4/2014 |

(Continued)

OTHER PUBLICATIONS

Official Communication issued in International Patent Application No. PCT/EP2017/062962, dated Jun. 16, 2017.

*Primary Examiner* — Ahshik Kim
(74) *Attorney, Agent, or Firm* — Stinson LLP

(57) ABSTRACT

A method for authenticating a product packaging includes reading a printed optical-machine-readable-code on the product packaging using a mobile device, determining if the printed optical-machine-readable-code includes a command for reading an RFID, and executing the command on the mobile device for reading the RFID, wherein the printed optical-machine-readable-code and the RFID are positioned at the same location on the product packaging.

14 Claims, 9 Drawing Sheets

(56) References Cited

U.S. PATENT DOCUMENTS

| | | | | |
|---|---|---|---|---|
| 2013/0105587 A1* | 5/2013 | Simske | ............... | G06K 19/083 |
| | | | | 235/492 |
| 2013/0206842 A1* | 8/2013 | Raz | ....................... | G06K 19/02 |
| | | | | 235/488 |
| 2016/0026838 A1* | 1/2016 | Gillet | ................... | G02B 26/101 |
| | | | | 235/462.21 |

FOREIGN PATENT DOCUMENTS

| | | |
|---|---|---|
| CN | 103854185 A | 6/2014 |
| GB | 2532033 A | 5/2016 |
| WO | 2008/061218 A2 | 5/2008 |
| WO | 2015/140157 A1 | 9/2015 |

\* cited by examiner

AUTHENTICATION METHOD FOR PRODUCT PACKAGING

CROSS REFERENCE TO RELATED APPLICATIONS

This application is a 371 National Stage Application of PCT/EP2017/062962, filed May 30, 2017. This application claims the benefit of European Application No. 16172344.0, filed May 31, 2016, which is incorporated by reference herein in its entirety.

BACKGROUND OF THE INVENTION

1. Field of the Invention

The present invention discloses an authentication method for product packaging by using the combination from an optical-machine-readable code and an RFID-tag to prevent counterfeiting of the product in a packaging and/or track-and-tracing the packaging.

2. Description of the Related Art

There exists an ever-increasing problem of counterfeiting within the industry of luxury goods such as the fashion industry and within the pharmaceutical sectors. Also the increasing problem of grey-market, also called parallel market, in consumer products becomes nowadays a big issue which needs to be avoided.

Track-and-tracing the product packaging in the transport between the several stadia from manufacturing the product to selling the product to the end-user is a well-known method to prevent counterfeiting. If in each of these stadia the product packaging is authenticated and accepted as the correct product, the product can be followed by the producer of the product. Authentication of products is sometimes in literature also called authentification of products which is an English corruption of the French word 'authentifier'.

A known method for authenticating is the use of optical-machine-readable code, such as one-dimensional bar-codes or QR-codes. The optical-machine-readable codes are mostly printed on a label which is glued on the packaging but currently it may also be printed on the packaging directly for example by an inkjet printing method. The variance in optical-machine-readable codes is huge but most of them are described in industry standards to have a worldwide recognition in the several industries. More information on such optical-machine-readable codes is disclosed in "Codes and Coding Technology, A guide to understanding barcode, symbology, types of codes, reading and verification equipment and industry standards", Michael Fairley, Tarsus Exhibitions & Publishing, 2015, ISBN 978-1-910507-06-3, wherein also the technology of reading devices for optical-machine-readable codes is explained. Nowadays these optical machine-readable codes are also readable by a mobile device wherein a digital imaging device, such as a camera, is built-in.

Another way for authenticating products is the usage of RFID-tags. Radio-frequency identification (RFID) uses electromagnetic fields to automatically identify and track tags attached to objects. The tags contain electronically stored information. Passive tags collect energy from a nearby RFID reader's interrogating radio waves. Active tags have a local power source such as a battery and may operate at hundreds of meters from the RFID reader. Nowadays these RFID-tags are also readable by a mobile device wherein for example a NFC (Near Field Communication)—device is built-in such as the Samsung™ Galaxy™ A9. The use of RFID-tag readers become more and more familiar on most mobile devices such as mobile phones and mobile computers). NFC-enabled mobile devices can be provided with apps, for example to read RFID-tags or make payments when connected to an NFC-compliant apparatus.

The usage of RFID-tags or the usage of printed optical-machine-readable codes has both the possibility to secure the authentication but the security can easily be circumvented. For example by scanning the optical-machine-readable code and reprinting the scanned optical-machine-readable code or reading all content from an RFID and applying a copy of the content to another RFID. Especially due to the joint Global Tag (GTAG) program from EAN International (Princeton, N.J.) and the Uniform Code Council Inc. (UCC, Brussels, Belgium) a large amount of this standard RFID-tag producers became available worldwide so it became easier to copy RFID-tags which is a disadvantage for the battle against counterfeiting.

By printing the optical machine-readable codes by digital printing systems, the optical machine-readable codes may nowadays be generated and printed on the fly wherein each optical machine-readable code comprises different content. Such solution is provided by Advanced Track & Trace™ (www.att-fr.com) with their Vary.IDs™, which are digital printed variable QR-codes.

The print quality of digital printed QR-codes is low, due to print resolution, which may result in easy scanning and copying of the QR-codes by counterfeiters. The managing of adding for example product information as content in the variable QR-codes is organizationally a nightmare. The variable QR-codes may be printed in a reproduction house by a digital printer such as HP Indigo Press™ and then applied in a production house on the product packaging. To link the content of the variable QR-code to the produced product and its product packaging may result in serious mistakes so track-and-trace and authentication of the product packaging is not possible.

To enhance the security on a correct authentication and to prevent the copying of the content enabled elements, such as QR-code or RFID-tag, on a product packaging a better solution is needed than currently available.

SUMMARY OF THE INVENTION

The present invention as defined below enhances the security and correctness of an authentication method, which may be comprised in a track-and-trace method, for product packaging such as packaging for luxury goods, pharmaceuticals and consumer goods.

In a nutshell, the present invention is a method for authenticating a product packaging comprising:
  reading a printed optical-machine-readable-code (800) on the product packaging (900) using a mobile device (700); and
  determining if the printed optical-machine-readable-code (800) comprises a command for reading an RFID; and
  executing the command on the mobile device (700) for reading the RFID; and
wherein the printed optical-machine-readable-code (800) and the RFID are at the same location on the product packaging.

The present invention and its preferred embodiments are further described in the chapter "Description of embodiments" of this disclosure.

DETAILED DESCRIPTION OF THE PREFERRED EMBODIMENTS

Figure 1:
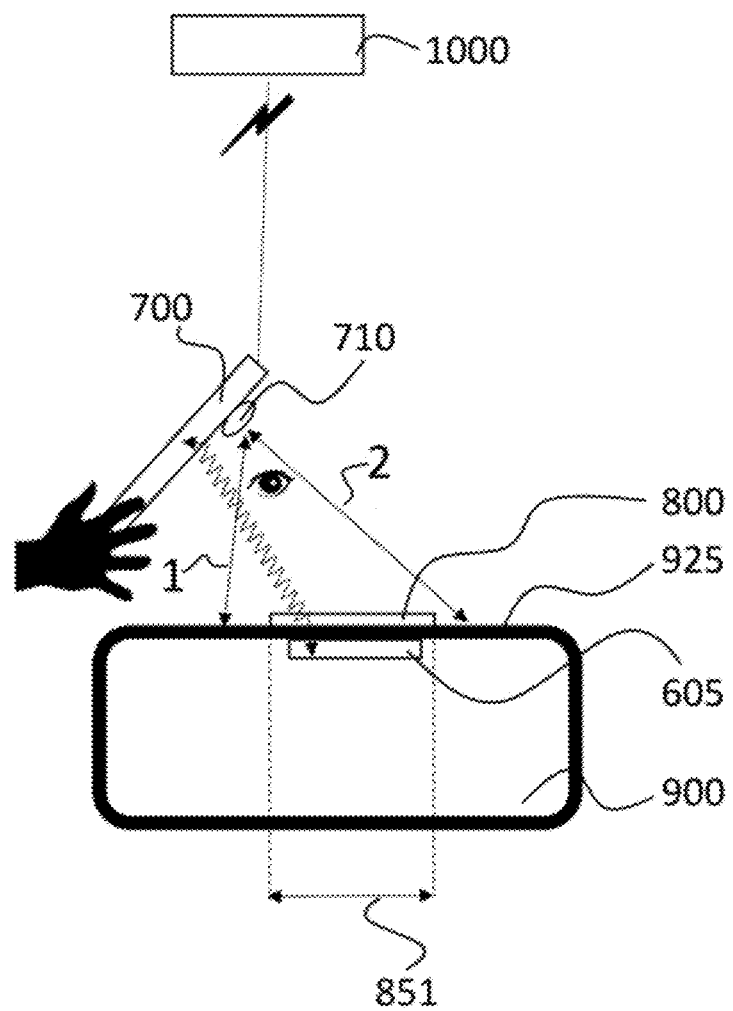
FIG. 1 depicts a product packaging, and an optical device to capture a printed optical-machine-readable-code and to read an RFID tag on the product packaging.

The present invention is a method for authenticating a product packaging (900) and/or product by a mobile device (700) comprising:
- capturing (100), by a digital imaging device (710) attached to the mobile device (700), a printed optical-machine-readable-code (800) on a surface (925) of the product packaging;
- determining (200) in a first captured zone (851) of the captured optical-machine-readable-code (805) a first content (CNT1, 811) and determining (210) if the first content (CNT1, 811) comprises a command for reading an RFID-tag; and
- executing (110) the command by the mobile device (700) and reading (120) from the read RFID-tag a second content (CNT2, 822), if the first content (CNT1, 811) is determined (210) to contain the command; and wherein the read RFID-tag (605) is positioned between the printed optical-machine-readable-code (800) and the surface (925) of the product packaging.

A command is also called a commando or instruction. The command may be embedded in the optical-machine-readable-code (800) which can be decoded by reading the optical-machine-readable-code (800). The command is then part of the first content whereof the command is determined. It is known that by reading an optical-machine-readable-code (800) a string of characters and/or numbers can be determined. This string of characters and/or numbers is then part of the first content. From this part of the first content can the command, as part of the string of characters and/or numbers, be determined. µ

The command may also be determined from the shape, a part of the captured optical-machine-readable-code, the position of the optical-machine-readable-code in function of surrounded image content.

The present invention combines the RFID-tag, which may be a passive or active RFID-tag, but preferably a passive RFID-tag for economical reasons and cost price, and a printed optical-machine-readable code (800), which preferably comprises a two-dimensional barcode and more preferably a digital fingerprint code. Because the RFID-tag and optical-machine-readable code are positioned at the same location on the product packaging (900) the mobile device has not to be moved and read the RFID-tag 'automatically' when such read-command is detected in content of the captured optical-machine-readable code. The reading of the printed optical-machine-readable code (800), determination of the RFID-read command and then directly executing the command by reading the RFID-tag (600), positioned at the same location of the printed optical-machine-readable code (800), makes the method of authentication fast which is a big economically advantage.

The present invention has the ability for storing a content in first element on the product packaging (900): a printed optical-machine-readable code (800) on the product packaging (900) and storing an other content in a second element on the product packaging (900): the RFID-tag attached to the product packaging (900). This makes the size of content on the product packaging (900) higher by this combination and if one of both elements is not working well there is still the probability to authenticate the product packaging by the content of the other element. One element may have more general content about the product in the product packaging and the other element may have production related content from the product. The combination of both contents makes the total content uniquely defined which makes it easier to authenticate the products and product packaging more accurate and with more information. One or both contents may comprise manufacturing code, manufacturing date, manufacturing place, production providence, expiration date, nutritional facts, weight and/or physical characterization, such as viscosity or hardness, of the product.

The content of either elements may be encrypted and/or data-compressed and/or comprising a check-sum for verification of the correctness of the content. Preferably the content is lossless data compressed. So in a preferred embodiment the first content (CNT1, 811) and/or second content (CNT2, 822) is encrypted and/or data-compressed and wherein the method comprises the step: data-decrypting (270) and/or decompressing (280) the first content (CNT1, 811) and/or second content (CNT2, 822). In another preferred embodiment the first content (CNT1, 811) and/or second content (CNT2, 822) comprises a check-sum code and wherein the method comprises the step: checking (290) the check-sum code against the first content (CNT1, 811) and/or second content (CNT2, 822).

In a preferred embodiment, the first content (CNT1, 811) comprises also the shape; a captured third reproduced zone and/or design of the printed optical-machine-readable code (800). This shape; the captured third reproduced zone and/or design may be the command of reading the RFID-tag. For example the printed optical-machine-readable code may comprise a logo in a third reproduced zone wherein the logo is after capturing recognised by an image recognition method. The recognition of the logo may be the command of reading the RFID-tag. So the content in a printed optical-machine-readable code may comprise also image content.

The RFID-tag is read by an RFID-reader attached to the mobile device. The RFID-reader may be connected to mobile device by an interface port such as an USB-port and preferably be built-in the mobile device. Built-in means that the RFID-reader is positioned inside the cover of the mobile device. The RFID-reader is preferably an RFID-reader using a Near Field Communication (NFC) protocol. The mobile device is then called a NFC-enabled mobile device. The NFC-enabled mobile device writes in preferred embodiment content or overwrites the second content (CNT2, 822) on the NFC-tag. Preferably the RFID-tag attached to the product packaging is an NFC-tag which may be a passive or active NFC-tag. The NFC may be standardized by ECMA-340; ISO/IEC 18092; ISO/IEC 14443 Type A; ISO/IEC 14443 Type B or FeliCa™.

The mobile device (700) is preferably a mobile computer; more preferably a mobile phone which are small and thus easy to handle the method of authentication and most preferably an NFC-enabled mobile phone. The mobile device comprises a CPU, such as Quad-core 2.3 GHz Krait 400, a digital imaging device and preferably a display for configuration user-friendly the mobile device. In a preferred embodiment of the present invention is captured optical-machine-readable code (805) visualized on the display of the mobile device. Several optical-machine-readable code readers are already developed as app for mobile devices such as a mobile phone: QR Code Reader by TWMobile™ or Agfa AR/ by Agfa Graphics™.

To ensure the mobility of the device the mobile device (700) comprises a battery such as Li-Ion 8220 mAh battery and comprises also a communication port to connect the mobile device wireless with other peripherals such as a server computer (1000). Examples of such communication ports are Wi-Fi 802.11 a/b/g/n/ac, dual-band, Wi-Fi Direct, hotspot, Infrared port, Bluetooth™ (v4.0) or via a GSM network.

The digital imaging device (710) is preferably a camera and more preferably a camera comprising autofocus; optical zoom (>5×), flash lamp (Xenon) and having minimum 7 Megapixels (MP), video capabilities of minimum 256p@60 fps. The display in the mobile device has preferably minimum a resolution of 720×1280 pixels. The digital imaging device in the present invention may be connect by an interface port, such as an USB-port but preferably is the digital imaging device built-in the mobile device. Built-in means that the digital imaging device is positioned inside the cover of the mobile device.

The packaging (900) is preferably selected from the group comprising ink packaging, food packaging, luxury good packaging and pharmacy packaging.

The printed optical-machine-readable code (800) may comprise a plurality of reproduced zones and thus the captured optical-machine-readable code (805) may comprise a plurality of captured zones which each of them are assignable to one of these reproduced zones. Each reproduced zone has its own printed pattern which is likely different between the printed patterns of the other reproduced zones. Each reproduced zone may comprise content which may be determined by image-recognition methods after capturing by an image capturing device (710). Mostly of these image-recognition methods are well-known in QR-code readings and in one dimensional bar-code readings. They are mainly based on the contrast between printed elements generated by modulation of dark and light bars in these reproduced zones.

The printed optical-machine-readable code (800) may comprise also colors for enhancing the storage size in these codes. If the optical-machine-readable code only comprises more than only black and white, the amount of information, if captured in color, is much higher. One of the issues of capturing a printed optical-machine-readable code (800) is the color dependency of the digital imaging device which is typically different between several mobile devices. This issue may be solved by converting the captured optical-machine-readable code (805) from a color dependent color space, such as RGB, to a color independent color space, such as CIELab, CIEXYZ or to a standardized color dependent color space, such as sRGB (see IEC 61966-2-1:1999).

In a preferred embodiment the determination (200) in the first captured zone (851) comprises the step of color converting (260) the captured optical-machine-readable-code (805) from a device-dependent color space to a device-independent color space. Color conversion from device-dependent to device-independent color space are for example disclosed in the specification of ColorSync™ from Apple. In a preferred embodiment the mobile device comprises a color management systel for these kind of color conversion. The color management system comprises preferably a color profile from the digital imaging device (710). More information on color management methods and color management system is disclosed in the specification of ICC color profiles by the International Color Consortium (www.color.org, ISO 15076-1:2005)

In a preferred embodiment the printed optical-machine-readable code (800) may comprise a reproduction of an image that comprises a set of unbroken curves wherein the first content (CNT1) is embedded by a plurality of N-bit data;

wherein each possible value of N-bit data has a thickness ($T_{N,i}$) and length ($L_{N,i}$); and wherein the plurality of N-bit data comprises a first N-bit data ($N_1$), subsequent by a different second N-bit data ($N_2$) on a curve of the set of unbroken curves; and wherein the thickness ($T_{N,i,1}$) of the value ($v_{N,1}$) of the first N-bit data ($N_1$) on the curve is different from the thickness ($T_{N,i,2}$) of the value ($v_{N,2}$) of the second N-bit data ($N_2$) and/or wherein the length ($L_{N,i,1}$) of the value ($v_{N,1}$) of the first N-bit data ($N_1$) on the curve is different from the length ($L_{N,i,2}$) of the value ($v_{N,2}$) of the second N-bit data ($N_2$). Such image is also called a digital fingerprint code. More details about how to determine content from a digital fingerprint code is disclosed in WO2015140157 (AGFA GRAPHICS). The advantage of such digital fingerprint code is that the standard used optical-machine-readable codes, such as QR code, are conspicuous on a product packaging which makes it easier to interpret a content embedded in the optical machine-readable reproduction.

In a more preferred embodiment the digital fingerprint code comprises for each possible value of N-bit data in the plurality of N-bit data of the digital fingerprint code has a color ($C_{N,i}$); and wherein the color ($C_{N,i,1}$) of the value ($v_{N,1}$) of the first N-bit data ($N_1$) on the curve is different from the color ($C_{N,i,2}$) of the value ($v_{N,2}$) of the second N-bit data ($N_2$).

The printed optical-machine-readable code (805) may be embedded in the design of the product package which makes it difficult to detect and to reproduce by others suppliers, thus against counterfeiting.

In another preferred embodiment the product package is a food packaging such as a package of carrots. This enables the possibilities of track-and-trace the enclosed food in the package, or the possibilities of adding secured information to a package of a food. More preferably is the product package a food packaging comprises a liquid as product and most preferably comprising a beverage as product.

In another preferred embodiment product package is a package of application software on a data storage device such as a package of an operating system on a Compact Disc Read-only memory (CD-ROM). This enables the possibilities of track-and-trace application software or the possibilities of adding secured information to a package of application software on a data storage device.

To enhance the security of the authentication method of the present invention, the method comprises preferably the following steps:
   selecting (220) a reproduction model comprising a digital image; and
   verifying (230) by the reproduction model if a second captured zone (852) from the captured optical-machine-readable-code (805) is a reproduction of the digital image.

A reproduction of a digital image by printing depends on the combination of the printing technology, the medium whereon the digital image is printed, also called print receiver or substrate, and the ink or toner that visualizes the digital image after printing.

The printing technology may be any conventional printing technology such as offset printing, gravure printing, flexography, letterpress printing, screen printing. These conventional printing methods are all described in 'Chapter 2. Printing Technologies With Permanent Printing Master', P 204-448 in 'Handbook of Print Media, Technologies and Production Methods' by Helmut Kipphan, ISBN 3-540-67326-1 Springer-Verlag Berlin Heidelberg New York, 2001. Or the printing technology may be a digital printing technology such as an electrophotography-based, iconography-based, magnetography-based, inkjet-based printing technology. These digital printing methods are all described in 'Chapter 4. Printing Computer to . . . Technologies', 'Subchapter 4.5 Computer to Print", P 657-674, and 'Chapter 5. Printing Technologies without a Printing Plate (NIP Technologies)', P 676-758 in 'Handbook of Print Media, Technologies and Production Methods' by Helmut Kipphan, ISBN 3-540-67326-1 Springer-Verlag Berlin Heidelberg New York, 2001.

The reproduction model gives a probability how high the resemblance is between the digital image and the second captured zone. Higher the resemblance; higher the certainty the printed optical-machine-readable-code (800) is not counterfeited. Therefore comprises the reproduction model the digital image. The probability score may define totally or partly the authentication of the product packaging from the present invention.

The reproduction model may also comprising a characterization how the digital image is printed depending on the ink; substrate and printing technology within a defined print quality range. The reproduction model gives then the probability how high the resemblance is of the digital image and a captured reproduction based on this characterization, also called the print behaviour. This characterization ensures a better probability testing between counterfeited optical-machine-readable-codes and non counterfeited optical-machine-readable-codes.

The print quality may be measured by one or more measuring methods as for example disclosed in ISO-13660, an international standard for objective print quality wherein the measuring method is a blurriness measuring method; a raggedness measuring method; line width measuring method; contrast measuring method. The print quality may be acceptable when printed in a determined range of this kind measurements which then defines the range of print quality.

For example a printed dot formed by one pixel or a plurality of neighbouring pixels in the digital image may be wetted on the substrate. The wetting may be defined by a surface tension from the substrate or the absorbance of the substrate. Or the wetting may be defined by the pressure of a roll against the printed dot and the substrate depending on the used printing technology. Or the wetting may be defined by the drying of the printed dot which depends on the used printing technology. Or the wetting may be a combination of the previous examples. This wetting is a typical characteristic that easily can be measured on several samples of the printed pixel or plurality of neighbouring pixels; preferably within a defined print quality range and more preferably within a narrow print quality range. Any digital image comprising only separated dots of these pixels or these plurality of neighbouring pixels may be converted how the digital image shall look like if printed with this characterization of wetting. A reproduction model preferably comprises a print simulation method such as is in the previous example which is a big advantageous because variances in the digital image may easily correct simulated without printing samples and in stead of generating a reproduction model for each digital image. A captured image may be compared against this simulated digital image and the resemblance can be calculated. Higher the resemblance, higher the probability that the captured image is not a counterfeited print of the digital image.

This is an example of characterization the wetting performance of neighbouring pixels on a specific substrate by a specific printing technology which can be added in such reproduction model. Reproduction models are also known in-the-state-of-arts of halftoning methods wherein the print behaviour is modelled to generate optimized halftones when rendering digital images. The same reproduction models may be used in the present invention wherein the reproduction model is used to simulate the digital image how it shall look like when printed and then comparing the resemblance of a captured image and this simulated digital image by the reproduction model. In a preferred embodiment comprises the reproduction model a Human Visual System (HVS) to simulate a digital image better to a real printed digital image. More information of such HVS; used in a halftoning method is disclosed in U.S. Pat. No. 4,920,501 (KODAK).

The resemblance in the verification-step (230) is preferably determined by one or more of the following methods:
   pixel-based image resemblance method;
   histogram-based image resemblance method;
   texture resemblance method;
   shape resemblance method.

The pixel-based image resemblance method between images compares the pixels between the images. The comparing determines the resemblance between the images. The pixel-based image resemblance method may use statistical methods such as variance and probability distribution.

The histogram-based image resemblance method between images compares histograms between the images. The comparing determines the resemblance between the images. The histogram-based image resemblance method may use statistical methods such as variance and probability distribution.

The shape resemblance method shapes in the images are compared. The identification of shapes may be achieved by applying image segmentation methods and/or edge detection methods in the discrete images.

The texture resemblance method compares the images in one or more positions and/or amount of a visual pattern in the images.

An overview of image analysis methods that may be comprised in the resemblance methods of preferred embodiments from the present inventions are disclosed in Part 5 "Image Analysis" [Page 419-678] of PRATT, William K. Digital Image Processing: PIKS Scientific Inside. 4th edition. John Wiley.

The selecting step (220) may also be performed on a connected server computer (1000) and thus not on the mobile device (700) for better performing reasons. The amount of memory and CPU power is mostly on mobile devices, especially mobile phones, less than on server computers (1000).

The verification step (230) may also be performed on a connected server computer (1000) and thus not on the mobile device (700) for better performing reasons.

The performing of several steps (200, 210, 220, 225, 230, 240, 250, 260, 270, 280, 290) of the present invention and the preferred embodiments of the present invention is preferred if the security level of the authentication method can be enhanced so thus not only for better performing reasons.

The reproduction model may be stored on the mobile device (700) but preferably stored on a connected server computer (1000) to guarantee a higher level of security in the authentication method from the present invention. If the mobile device (700) is lost or hacked, reproduction models stored on the mobile device (700) becomes available to counterfeiters.

In a preferred embodiment the verification comprises the step of color converting (260) the captured optical-machine-readable-code (805) from a device-dependent color space to a device-independent color space. Preferably the digital image is then also defined in the same device-independent color space.

The color converting step (260) may also be performed on a connected server computer (1000) for better performing reasons.

Several reproduction models may be stored in memory in the mobile device (700), in memory on a connected server computer (1000), in record on a connected database (1200) or even fully stored in the first content (CNT1, 811) or second content (CNT2, 822). The connected database (1200) is preferably stored in memory from the mobile device (700) but more preferably stored on the connected server computer (1000) which guarantees a higher security level of the authentication method from the present invention. If the connected database (1200) should be stored on the mobile device, the stored reproduction models, as records, in the connected database (1200) may become available to counterfeiters when the mobile device is stolen or hacked.

In a preferred embodiment the reproduction model is selected (220) by determining (225) the reproduction model from the first content (CNT1, 811) and/or from the second content (CNT2, 822). The reproduction model may be determined by an unique key in the first content (CNT1, 811) and/or second content (CNT2, 822). The unique key makes it possible to determine the reproduction model which is stored on the mobile device (700) or on the connected server computer (1000) or from a connected database (1200).

The determination step (225) of the reproduction model from the first content (CNT1, 811) and/or from the second content (CNT2, 822) may also be performed on a connected server computer (1000) and thus not on the mobile device (700) for better performing reasons.

In a preferred embodiment the digital image, whereof the captured optical-machine-readable-code (805) a reproduction is, comprises preferably an anti-copying pattern. The anti-copying may be a void pantograph which works by exploiting the limitations and features of copying equipment. A scanner or photocopier will act as a low-pass filter on the printed optical-machine-readable-code (800), blurring edges slightly. It will also not be perfectly aligned with the directions of the document, causing aliasing. Features smaller than the resolution will also not be reproduced. In addition, human vision is sensitive to luminance contrast ratio. Numerous methods exist, including printing the marks using a raster of lines in one direction on a background of lines in another direction or using fine line patterns that alias into a visible moiré pattern when copied.

A review of known anti-copying methods and patterns are disclosed in "New Digital Anti-Copy/Scan and Verification Technologies", by George K. Phillips, Published in Proceedings Volume 5310: Optical Security and Counterfeit Deterrence Techniques V, June 2004.

The comprising of such anti-copying pattern makes the preferred embodiment the advantage of an authentication method with a higher security level against counterfeiting. The use of such anti-copying patterns makes the reproduction model and the verification-method more reliable because such anti-copying patterns are developed for the printing technology which is used to print the optical-machine-readable-code and the anti-copying pattern is only working when printed by this printing technology.

In a preferred embodiment of the present invention comprises the steps:

connecting (130) to a database (1200); and
combining (240) the first content with the second content to a linkage; and
executing a query on the database (1200); and
comparing (250) the linkage with the query.

By combining the first content with the second content a unique key may be created which may searched in a connected database (1200). If the unique key is found then the authentication method for the product packaging may result in a positive result; else the product packaging is a counterfeited product and/or product packaging. Information of the product packaging and/or product may be stored in that connected database which may be returned to the mobile device (700) if that unique key is found in the connected database and that this information of the product and/or product is linked to this unique key. The returning of the information may be performed by receiving the information from the connected database to the mobile device (700). The returned information may be displayed on the display of the mobile device (700).

The combining step (240) and/or comparing step (250) may also be performed on a connected server computer (1000) and thus not on the mobile device (700) for better performing reasons.

The connected database (1200) is preferably stored in memory from the mobile device (700) but more preferably stored on the connected server computer (1000) which guarantees a higher security level of the authentication method from the present invention. If the connected database (1200) should be stored on the mobile device, the stored reproduction models, as records, in the connected database (1200) may become available to counterfeiters when the mobile device is stolen or hacked.

In a preferred embodiment the authentication method comprises the steps:
  connecting (140) the mobile device (700) to a server computer (1000); and
  sending (150) the captured optical-machine-readable-code (805); and
  sending (160) the second content (CNT2, 822) to the server computer (1000); and
wherein the determination steps (200, 210, 220, 225, 230, 240, 250), the selection step (220), the verification step (230), the combining step (240) and the comparing step (250) are performed on the server computer (1000).

In a similar preferred embodiment the authentication method comprises the steps:
  connecting (140) the mobile device (700) to a server computer (1000); and
  sending (150) the first content (CNT1, 811); and
  sending (160) the second content (CNT2, 822) to the server computer (1000); and
wherein the determination steps (200, 210, 220, 225, 230, 240, 250), the selection step (220), the verification step (230), the combining step (240) and the comparing step (250) are performed on the server computer (1000).
But sending (150) of the captured optical-machine-readable-code (805) from the previous preferred embodiment is preferred because the verification step (230) is better performed on the server computer (1000) and for enhancing the security level of the authentification method because the reproduction model is for this reason better stored on the connected server computer (1000) and connected database (1200).

The connection-step is preferably made by a WIFI-connection or a telephone-connection where over the captured optical-machine-readable-code (805) and the second content (CNT2, 822) is sent to the connected server computer (1000).

To know if the product or product packaging (900); after capturing the printed optical-machine-readable-code (800) is not a counterfeited or a result from a grey market, a preferred embodiment wherein the result from the comparing-step (250) and/or result from the verification-step (230) of the pattern is displayed (180) on the mobile device (700) after the result from the comparing-step (250) and/or the result from the verification-step (230) is received (170) from the server computer (1000) to the mobile device (700).

Additionally, part or whole of the CPU and/or the functional units or blocks thereof as described above with respect to the various preferred embodiments of the present invention be implemented in one or more circuits or circuitry, such as an integrated circuit(s) or as an LSI (large scale integration). Each functional unit or block of the CPU may be individually made into an integrated circuit chip. Alternatively, part or whole of the functional units or blocks may be integrated and made into an integrated circuit chip. Additionally, the method of forming a circuit or circuitry defining the CPU is not limited to LSI, and an integrated circuit may be implemented by a dedicated circuit or a general-purpose processor or controller that is specifically programmed to define a special-purpose processor or controller. Further, if technology of forming an integrated circuit, which replaces LSI, arises as a result of advances in semiconductor technology, an integrated circuit formed by that technology may be used.

Furthermore, a program which is operated in the CPU and/or other elements of various preferred embodiments of the present invention, is a program (program causing a computer to perform a function or functions) controlling a CPU, in order to realize functions of the various preferred embodiments according to the present invention, including each of the various circuits or circuitry described herein and recited in the claims. Therefore, information which is handled by the CPU is temporarily accumulated in a RAM at the time of the processing. Thereafter, the information is stored in various types of circuitry in the form of ROMs and HDDs, and is read out by circuitry within, or included in combination with, the CPU as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in the present invention. In addition, in the preferred embodiments described above, a portion of terminal device, the wireless base station, the host system, or other devices, or the whole thereof may be realized as an LSI which is typically an integrated circuit. Each functional unit or block of the CPU, may be individually chipped, or a portion thereof, or the whole thereof may be chipped by being integrated. In a case of making each functional block or unit as an integrated circuit, an integrated circuit controller that controls the integrated circuits, is added.

Additionally, the method for making an integrated circuit is not limited to the LSI, and may be realized by a single-purpose circuit or a general-purpose processor that is programmable to define a special-purpose computer. Moreover, in a case of an appearance of a technology for making an integrated circuit which replaces the LSI due to an advance of a semiconductor technology, it is possible to use an integrated circuit depending on the technology.

Finally, it should be noted that the description and recitation in claims of this patent application referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

Other embodiments

The previous embodiment with its preferred embodiments may be also adapted to the products themselves in stead of product packaging. So another embodiment is:

A method for authenticating a product by a mobile device (700) comprising:
- capturing (100), by an digital imaging device (710) attached to the mobile device (700), a printed optical-machine-readable-code (800) on a surface of the product;
- determining (200) in a first captured zone (851) of the captured optical-machine-readable-code (805) a first content (CNT1, 811) and determining (210) if the first content (CNT1, 811) comprises a command for reading an RFID-tag; and
- executing (110) the command by the mobile device (700) and reading (120) from the read RFID-tag a second content (CNT2, 822), if the first content (CNT1, 811) is determined (210) to contain the command; and wherein the read RFID-tag (605) is positioned between the printed optical-machine-readable-code (800) and the surface of the product.

The product is preferably a luxury good or a fashion good, more preferably a luxury leather good or a leather fashion good.

The product is preferably a medical device such as a digital radiography panel (DR-panel). This enables the possibilities of track-and-trace the medical device or the possibilities of adding secured information to the medical device.

All preferred embodiments of the present invention with product packaging counts also on this other invention.

FIG. 1 illustrates a product packaging (900) wherein an RFID-tag (605) is positioned between a printed optical-machine-readable-code (800) and a surface (925) of said product packaging (900). In a first step (1) the printed optical-machine-readable-code (800) is captured within a first captured zone (851) by a digital imaging device (710) from a mobile device (700). In a second step (2) the RFID-tag (605) is read by the mobile device (700), having the digital imaging device (710). The mobile device (700) is connected to a server computer (1000).

Figure 2:
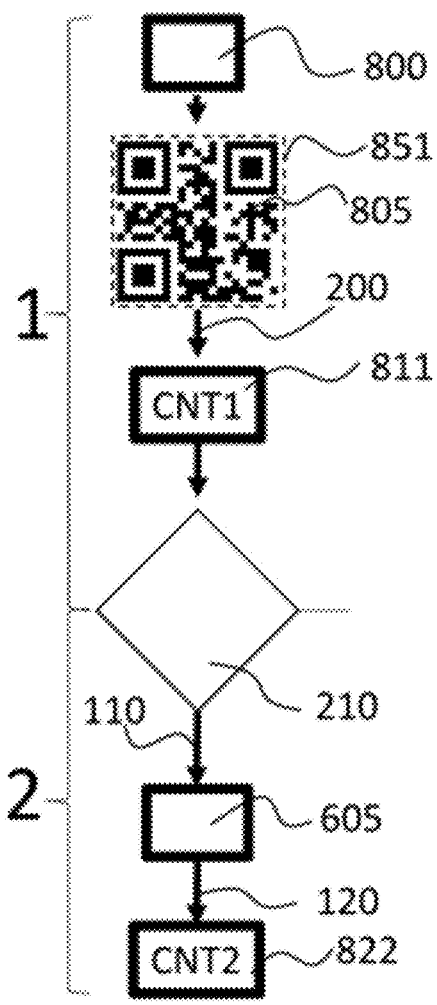
FIG. 2 depicts a workflow for the process in FIG. 1, wherein a first content and possibly a second content are determined.

FIG. 2 discloses a workflow to illustrate further the first and second step (1, 2) of FIG. 1. In the first step (1) the printed optical-machine-readable-code (800) is captured within the first captured zone (851) where after a first content (CNT1, 811) is determined (200) from the captured optical-machine-readable code (805). From the content (CNT1, 811), it is determined (210) if the content (CNT1, 811) comprises a command for reading the RFID-tag (605). If it is determined, the command is executed (110) and the RFID-tag (605) is read (120) to determine a second content (CNT2, 822).

Figure 3A:
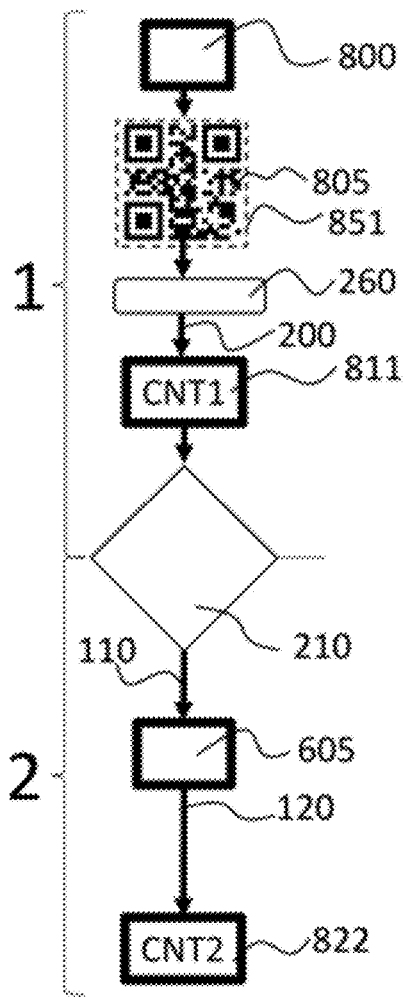
FIG. 3A depicts a workflow similar to the workflow in FIG. 2, wherein the captured optical-machine-readable code is color converted.
Figure 3B:
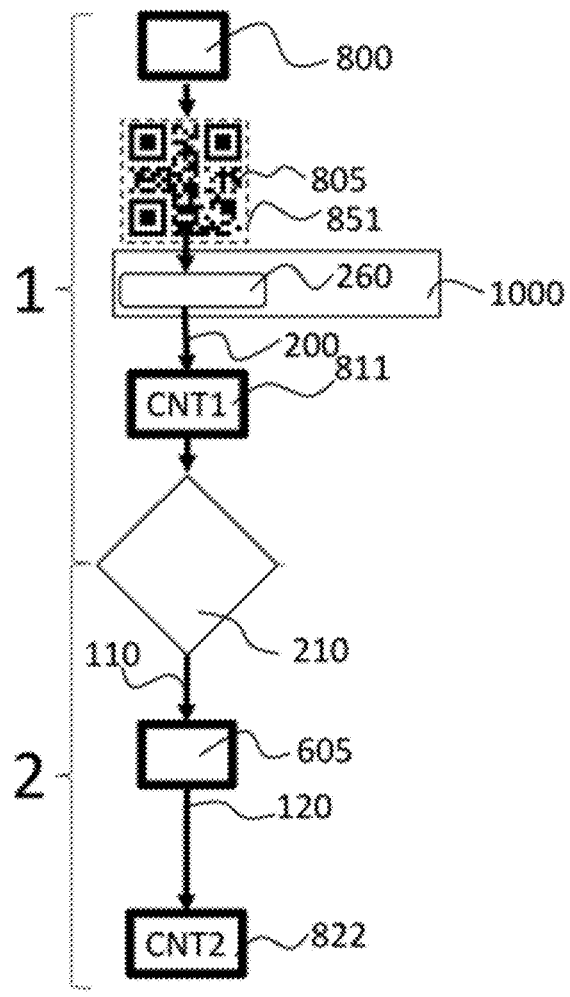
FIG. 3B depicts a workflow similar to the workflow in FIG. 3A, wherein the color conversion is performed on a server computer.

FIG. 3A and FIG. 3B each illustrate a workflow similar to FIG. 2, wherein the captured optical-machine-readable code (805) is color converted (260) before determining the first content (CNT1, 811). The color conversion is in FIG. 3B performed on a server computer (1000).

Figure 4A:
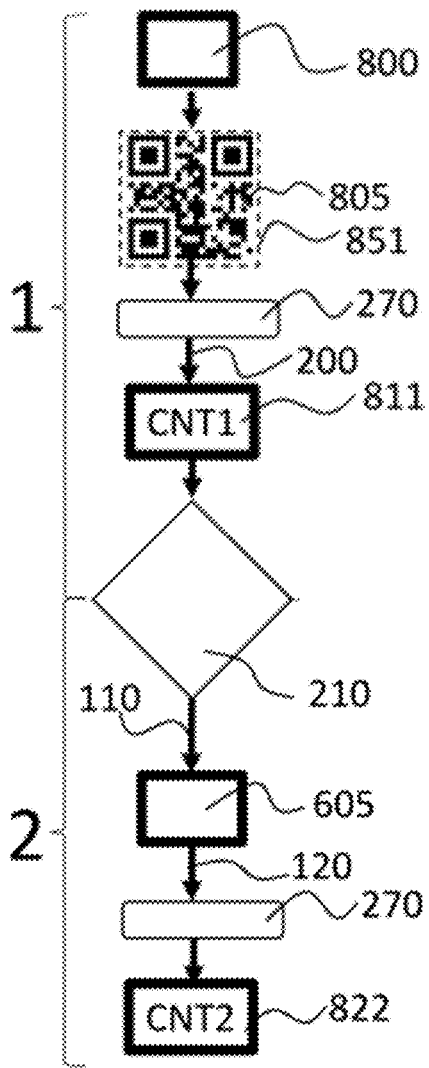
FIG. 4A depicts a workflow similar to the workflow in FIG. 2, wherein data-decryption of a check-sum code is performed in the step of determination of the first and second content.
Figure 4B:
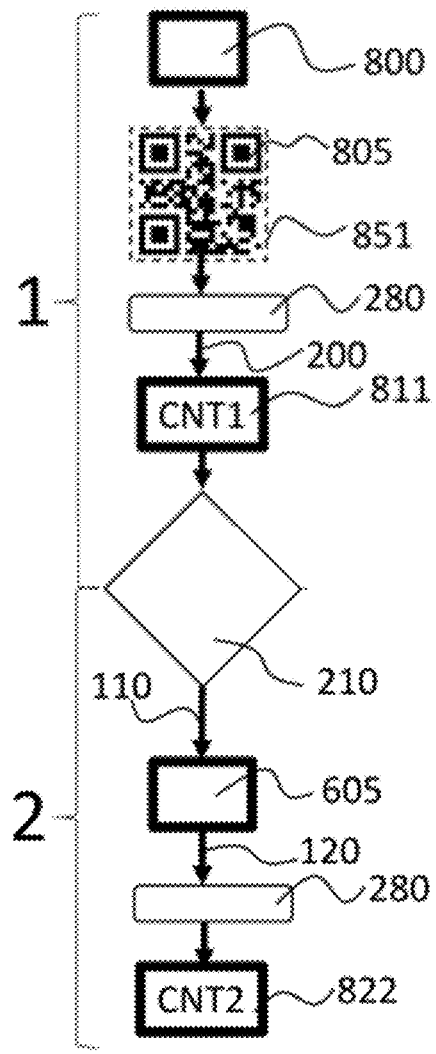
FIG. 4B depicts a workflow similar to the workflow in FIG. 2, wherein decompression of a check-sum code is performed in the step of determination of the first and second content.
Figure 4C:
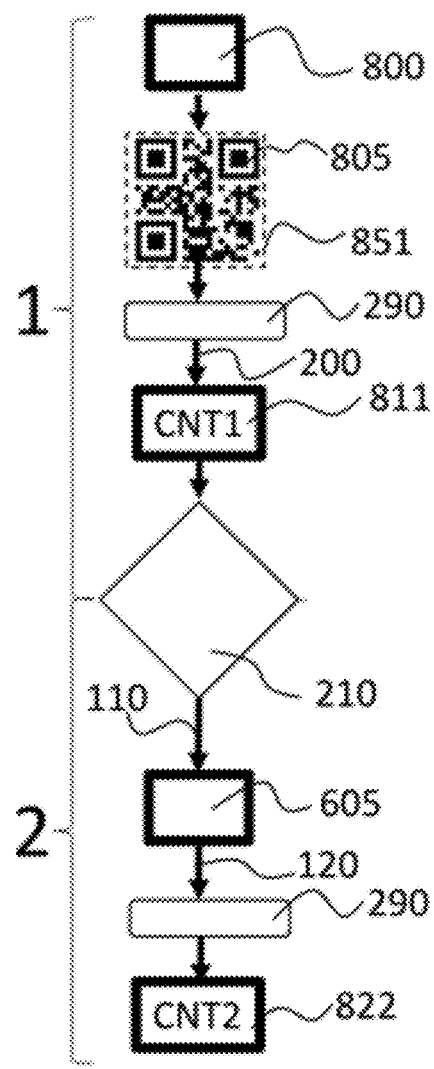
FIG. 4C depicts a workflow similar to the workflow in FIG. 2, wherein checking of a check-sum code is performed in the step of determination of the first and second content.

FIG. 4A, 4B, 4C each illustrate a workflow similar to FIG. 2, whereby in the step of determination of the first and second content (811, 822), data-decryption (270), decompression (280) and checking (290) a check-sum code is performed, respectively.

Figure 5A:
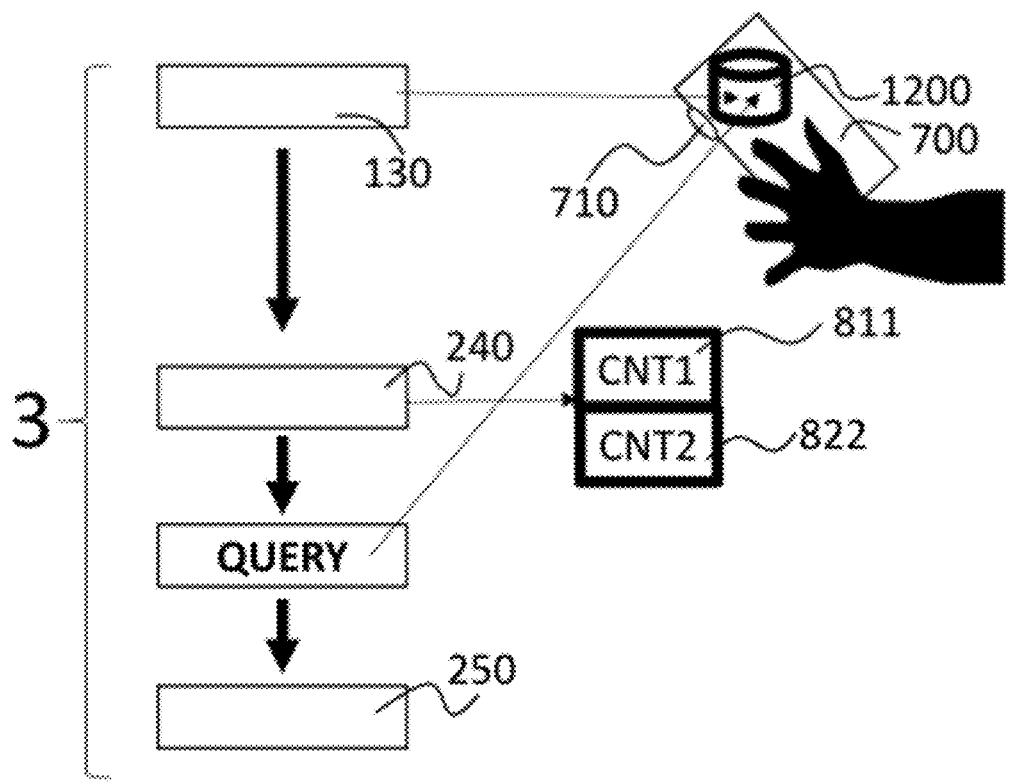
FIG. 5A depicts a third step for the workflow in FIG. 2, the third step including connecting to a database, combining the first content with the second content, executing a query, and comparing the linkage with the query.
Figure 5B:
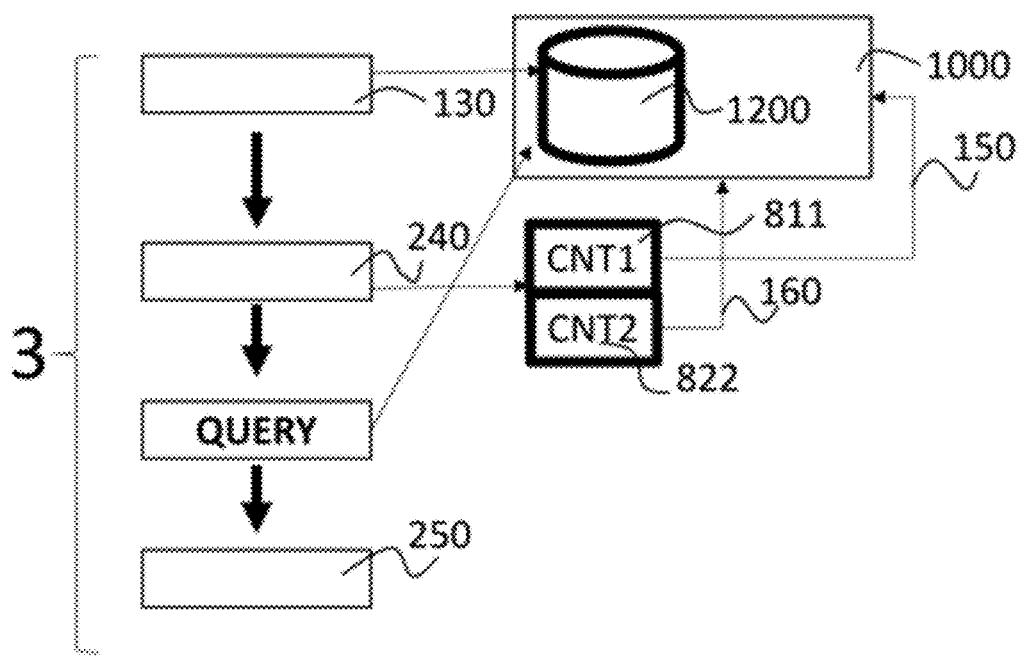
FIG. 5B depicts a workflow similar to the workflow in FIG. 5A, wherein the database is part of a server computer.

FIGS. 5A and 5B each illustrate further an additional third step (3) for the workflow in FIG. 2: connecting (130) to a database (1200); combining (240) the first content (CNT1, 811) with the second content (CNT2, 822) to a linkage; executing a query (QUERY) on the database (1200); and comparing (250) the linkage with the query.

In FIG. 5A, the database (1200) is part of the mobile device (700) and, in FIG. 5B, the database (1200) is part of a server computer (1000) whereto the first content (CNT1, 811) is sent (150) and the second content (CNT1, 822) is sent (160).

Figure 6A:
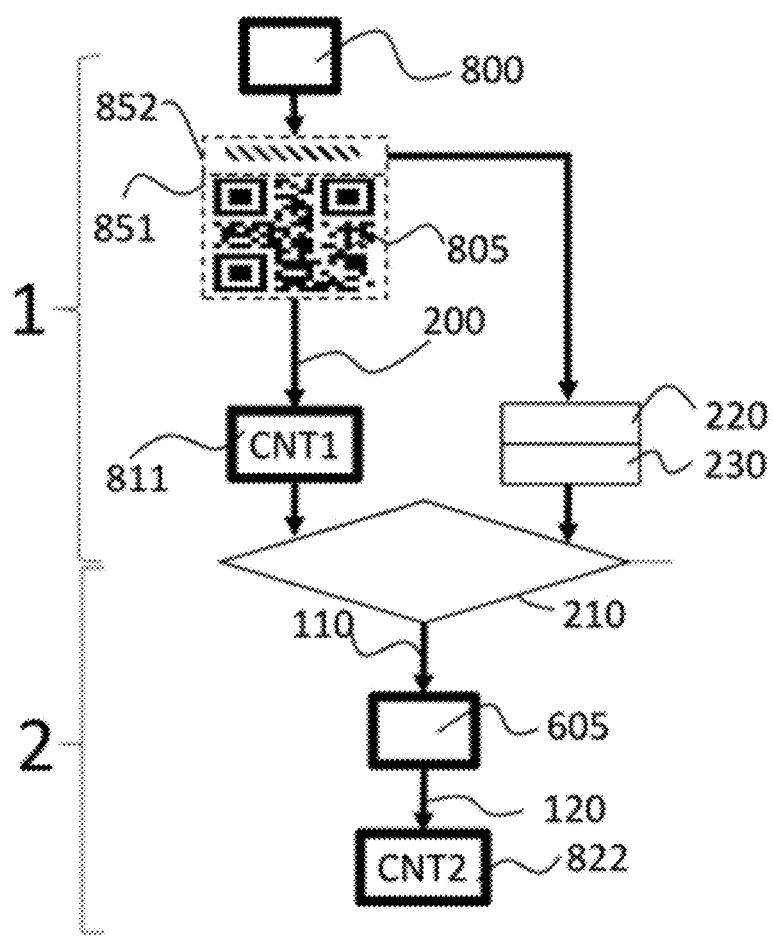
FIG. 6A depicts a workflow similar to the workflow in FIG. 2, having the additional steps of selecting a reproduction model and verifying by the reproduction model.
Figure 6B:
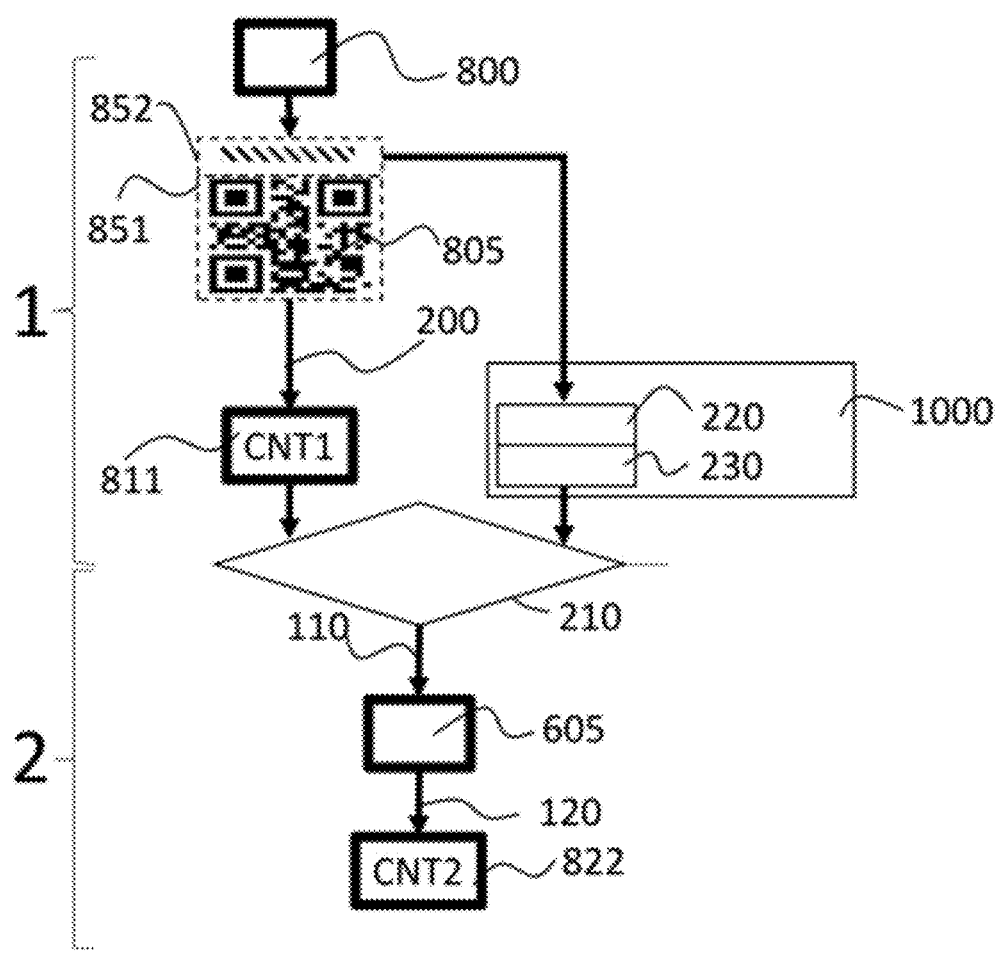
FIG. 6B depicts a workflow similar to the workflow in FIG. 6A, wherein the selection-step and verifying-step are performed on a server computer.

FIGS. 6A and 6B each illustrate a workflow similar to FIG. 2 having additional steps: selecting (220) a reproduction model comprising a digital image; and verifying (230) by the reproduction model if a second captured zone (852) from the captured optical-machine-readable-code (805) is a reproduction of the digital image.

In FIG. 6B, the selection-step (220) and verifying-step (230) is performed on a server computer (1000).

The invention claimed is:

1. A method for authenticating a product packaging with a mobile device, the method comprising:
   - capturing, with a digital imaging device attached to the mobile device, a printed optical-machine-readable-code on a surface of the product packaging;
   - determining in a first captured zone from the captured optical-machine-readable-code a first content and determining if the first content includes an instruction to read an RFID-tag;
   - executing the instruction with the mobile device and reading from the read RFID-tag a second content, if the first content is determined to include the instruction;
   - selecting a reproduction model and a digital image to calculate a resemblance of the digital image and a reproduction of the digital image, the reproduction model and the digital image being stored in a memory of the mobile device or in a memory of a server computer connected with a mobile device; and
   - verifying, on the mobile device or the server computer, with the selected reproduction model if a second captured zone from the captured optical-machine-readable-code is a reproduction of the selected digital image; wherein
   - the RFID-tag is positioned between the printed optical-machine-readable-code and the surface of the product packaging.

2. The method according to claim 1, wherein the reproduction model is selected by determining the reproduction model from the first content and/or from the second content.

3. The method according to claim 1, wherein the digital image includes an anti-copying pattern.

4. The method according to claim 1, further comprising the steps of:
   - connecting the mobile device to a database on the mobile device or the server computer;
   - combining the first content with the second content to a linkage;
   - executing a query on the database; and
   - comparing the linkage with the query.

5. The method according to claim 4, further comprising the steps of:
   - connecting the mobile device to the server computer;
   - sending the captured optical-machine-readable-code; and
   - sending the second content to the server computer; wherein
   - the steps of determining, selecting, verifying, combining, and comparing are performed on the server computer.

6. The method according to claim 5, wherein a result from the step of comparing and/or a result from the step of verifying is displayed on the mobile device after the result from the step of comparing and/or the result from the step of verifying is received by the mobile device from the server computer.

7. The method according to claim 6, wherein a determination in the first captured zone and/or a verification of the second captured zone includes a step of:
   color converting the captured optical-machine-readable-code from a device-dependent color space to a device-independent color space.

8. The method according to claim 7, wherein the first content and/or the second content from the product packaging includes a manufacturing code, a manufacturing date, a manufacturing place, a physical characterization, and/or a manufacturing weight of a product in the product packaging.

9. The method according to claim 8, wherein the product packaging is selected from the group consisting of ink packaging, food packaging, luxury good packaging, and pharmacy packaging.

10. The method according to claim 9, wherein the first content and/or the second content is encrypted and the method further comprises the step of:
    decrypting the first content and/or the second content.

11. The method according to claim 9, wherein the first content and/or the second content is data-compressed and the method further comprises the step of:
    data-decompressing the first content and/or the second content.

12. The method according to claim 9, wherein the first content and/or the second content includes a check-sum code and the method further comprises the step of:
    checking the check-sum code against the first content and/or the second content.

13. The method according to claim 1, wherein the mobile device is an NFC-enabled mobile device selected from the group consisting of a mobile computer and a mobile phone.

14. The method according to claim 1, wherein the first captured zone includes a set of unbroken curves and the first content is embedded by a plurality of N-bit data, N being a non-zero positive integer;
    each possible value of the plurality of N-bit data has a thickness and/or length;
    the plurality of N-bit data includes a first N-bit data and a second N-bit data, different from the first N-bit data, on a curve of the set of unbroken curves; and
    the thickness of the value of the first N-bit data on the curve is different from the thickness of the value of the second N-bit data, and/or the length of the value of the first N-bit data on the curve is different from the length of the value of the second N-bit data.

* * * * *